Jan. 3, 1956  A. H. STANTON, JR., ET AL  2,729,134
PREDETERMINED TORQUE RELEASE THUMB SCREW
Filed Feb. 2, 1953
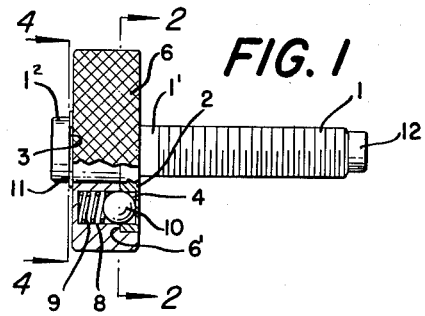
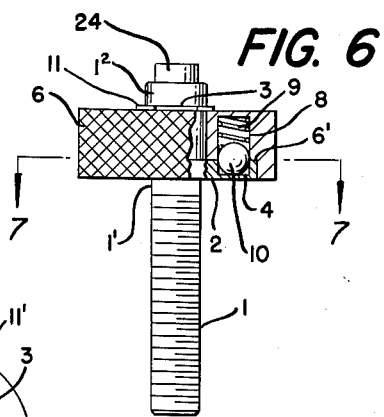
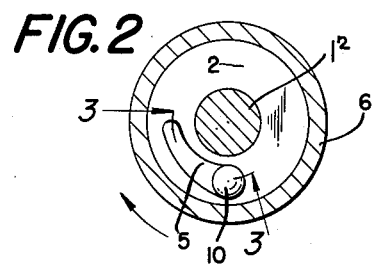
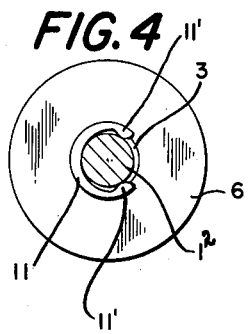
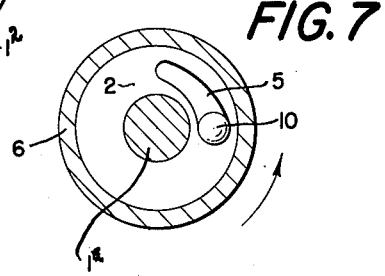
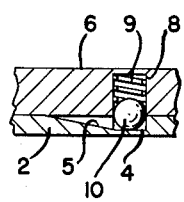
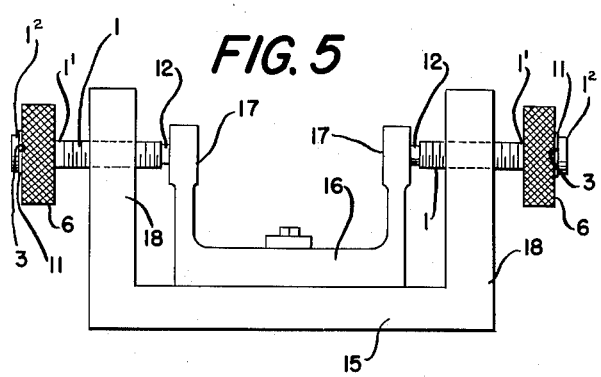
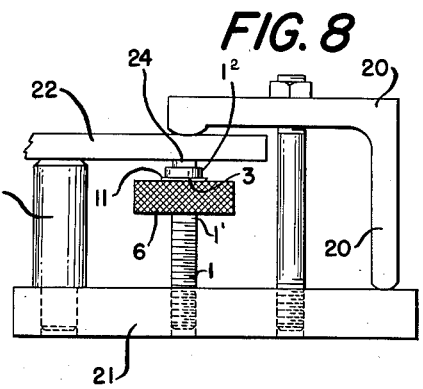
INVENTORS
ARTHUR H. STANTON, JR. &
LE ISLE D. NOBLE
BY George W. Saywell
ATTORNEY

| United States Patent Office | 2,729,134
Patented Jan. 3, 1956 |

2,729,134

PREDETERMINED TORQUE RELEASE THUMB SCREW

Arthur H. Stanton, Jr., Chagrin Falls, and Le Isle D. Noble, Hudson, Ohio, assignors to The Standard Parts Company, Bedford, Ohio, a corporation of Ohio Application February 2, 1953, Serial No. 334,508

1 Claim. (Cl. 85—61)

The invention relates to thumb screws and particularly to torque thumb screws utilized to maintain work pieces in proper position for a machining operation. More particularly, the invention is designed to prevent the work pieces being forced out of proper position by the pressure applied thereto incident to the machining operation.

The invention consists in a new combination of elements for applying only such pressure as will counteract the pressure of the machine tool.

The invention is adaptable to various situations where it is desired to apply and maintain a predetermined pressure.

The invention is also utilized in slightly modified form as a jack screw by which the work piece may be supported and properly retained in position during a machining operation thereon. In such use the improved thumb screw provides an additional or a center support for the work.

The annexed drawing and the following description set forth in detail certain means illustrating the invention, such drawing and description showing, however, only two of the various forms in which the invention may be embodied.

In said annexed drawing:

Figure 1 is a side elevation of the improved torque thumb screw, partially in section in an axial plane;

Figure 2 is a transverse section, taken in the plane indicated by the line 2—2, Figure 1, the plane being across the outside face of a disc plate on a screw stem and serving as the inside face of a manual knurled knob;

Figure 3 is a fragmentary section, taken along the plane indicated by the line 3—3, Figure 2;

Figure 4 is an end elevation, taken from the plane indicated by the line 4—4, Figure 1, the view including a cross-section through a groove formed on an enlarged portion of the screw stem;

Figure 5 is an elevation showing the use of the improved torque thumb screw in maintaining the proper position, during milling, of a work piece bolted to a milling fixture;

Figure 6 is an elevation of the improved torque thumb screw of a design adapted to function as a jack screw for additional support of work pieces, the view being partially in section in an axial plane;

Figure 7 is a transverse section, similar to Figure 2, and taken in the plane indicated by the line 7—7, Figure 6; and Figure 8 is an assembly illustrating the functioning of the improved thumb screw when acting as a jack screw.

Referring to the annexed drawing, particularly Figures 1 to 5, inclusive, in which the same parts are indicated by the same respective numbers in the several views, a screw having an inner threaded stem end portion 1 has a surrounding disc plate 2 formed on the outer end of an intermediate unthreaded stem portion 1¹. The disc 2 in its outer face is formed with a seat 4 for a ball 10. The end of the screw opposite the threaded end 1 is an enlarged plain portion 1² extending inwardly to the outer face of the disc 2. Formed in the stem portion 1² adjacent the outer face of a knob 6 is a peripheral groove 3.

The disc 2 is fitted within an annular flange 6¹ of a knurled cylindrical knob 6 having a cylindrical longitudinal recess 8 whose axis is parallel to that of the ball seat 4 and the stem portion 1². The flange 6¹ is rotatable upon the disc 2. Contained within the recess 8 and abutting the bottom thereof is a compression spring 9 upon which the ball 10 rests, the spring 9 thus normally holding the ball 10 to the seat 4. The inner end of the recess 8 and the seat 4 form a ball chamber, the seat 4 being in effect an extension of the recess 8. Leading into the ball seat 4 is the deeper and wider end of a groove 5 formed in the outer face of the disc plate 2, the groove 5 being concentric with the stem portion 1² and being of continuously narrower and shallower dimensions clockwise to its opposite end where it merges into the outer face of the disc 2.

The knob 6 is retained in position on the stem portion 1² against the disc 2 by a spring split ring 11 which seats in the stem groove 3. The outside diameter of the split ring 11 when seated is somewhat greater than that of the stem part 1² and, furthermore, the ends of the split ring 11 are somewhat wider than its body, being formed into somewhat widened and somewhat straightened terminals 11¹. Thus the split ring 11 is not only seated in the groove 3 but it abuts the exterior face of the knurled knob 6 and so retains the knob 6 and stem 1 in proper assembled condition, as shown in Figures 1 and 4. However, the ring 11 does not prevent the relative turning movement of the knob 6 and the stem 1.

To separate the stem 1 and knob 6 it is necessary to somewhat unseat an end 11¹ of the split ring 11 and then remove the split ring 11 from the groove 3 by pulling on its mid-section which expands and becomes somewhat separated from the stem part 1² by the unseating action of its end 11¹.

It is evident from the foregoing description that a rotation clockwise of the knurled knob 6, Figures 1 and 2, will cause the stem 1 to be threaded through a fixture arm 18, Figure 5, and into abutting position with a work piece 16 but that sufficient pressure will cause the ball 10 to travel along the groove 5 and gradually recede into the recess 8 against the pressure of the spring 9 until the tapering and narrowing groove 5 causes the ball 10 to recede completely into the recess 8 whereupon the knob 6 will turn freely around the disc 2. This free action of the knob 6 will be indicated not only by the easing of pressure necessary to turn knob 6 but also by the clicking caused by the passage of the knob 6 over the surface of the receded ball 10. Thus the device is self-releasing insofar as the prevention of additional pressure on the work piece is concerned.

Suitable calculations will have determined what the pressure is that is suitable for so back-supporting the work piece that it will not be forced out of proper position by the operation pressure applied thereto. It has been found that only comparatively slight pressure is required upon the work piece to hold it in proper position, and the spring 9, ball 10, and groove 5 can be calibrated properly to produce only this light pressure before the knob 6 turns freely upon disc 2.

A use of the improved torque thumb screw for maintaining the proper position of a work piece 16 bolted to a milling fixture 15 is illustrated in Figure 5. The work piece 16 is first bolted to the fixture 15, and then the stems 1 of the torque screws threaded through the arms 18 of the fixture 15 and against those surfaces of the work piece 16 opposite to the surfaces 17 which are to be milled. The desired and suitable pressure for the purpose stated is obtained as above described.

It is evident that the improved screws will prevent the surfaces of the work piece being operated upon from spreading outwardly by reason of pressure applied to the surfaces 17 during the milling operation.

The inner end 12 of the stem 1 which is pressed against the work piece 16 is preferably of small diameter or may even be substantially a point contact surface in order that any uneven surface of the work piece or any granular material thereon will not operate adversely to the precise centralization of the screw pressure thereon.

The form of the improved device shown in Figures 6, 7, and 8, is one in which the movement of the knurled knob 6 to support the work piece 22 is counterclockwise. The groove 5 also tapers counterclockwise. Thus it will be possible to move the knob end of the screw toward the work piece 22. The function of the device is that of a jack screw. The stem 1 is threaded out of the fixture base 21 and its wide outer end portion 1² brought into contact as a supporting medium with the undersurface of the work piece 22 upon which the machine operation is to be performed. The work piece 22 is first mounted on any suitable support such as suggested by "23" and the clamp 20 is bolted to table 21, after which the left hand jack screw, or, preferably, a plurality of them are threaded upwardly to contact at desired pressure with the under surface of the work piece 22 and thus maintain the work piece 22 with seated precision. Thus the jack screw is an additional and/or central support or supports for the work piece 22 against drill or other tool pressures. As hereinbefore stated relative to the stem 1, Figure 1, the stem of the left hand screw at its end which supports the work piece 22 is of comparatively narrow contact area 24 for the purpose of assuring precise centralization of the screw stem against the work piece 22.

In both forms of the device shown and described, the knob 6 and the screw stem are readily taken apart for the clearing therefrom of any chips, dirt or other extraneous defacing material that may obtain access to the space between the disc 2 and the knob 6. Furthermore, the receding movement of the ball 10 is in a direction parallel to the axis of the stem 1 thus eliminating a crosswise hole in the knob for accommodating the ball and spring, a structure which is already known in this art of maintaining in proper position work pieces upon which machining operations are to be performed. The formation of these crosswise holes is a difficult recessing operation.

What we claim is:

A torque thumb screw comprising a stem having a threaded inner end portion and an intermediate plane portion, the outer end of said stem being an enlarged plane portion, a plate disc secured to and surrounding the intermediate plane portion of the stem adjacent the inner end of the enlarged portion thereof, a knob rotatable relatively to the disc and for which the latter forms an inner end plate, the enlarged end portion of the stem being extended outwardly of the knob and being formed with a peripheral groove adjacently exterior of the outer face of the knob, a split spring ring seated in the groove and having one face thereof abutting the outer knob face thus removably retaining the knob and stem in assembled position, a recess in the knob having an axis parallel to the stem axis, a compression spring seated at one end on the bottom of the recess, a ball seat in the outer face of the disc, an arcuate groove in the outer face of the disc, said groove being coaxial with the stem axis and being of narrowing and depth-decreasing formation from end to end and merging at its narrowest and shallowest end into the outer face of the disc, the widest and deepest end of the groove merging into the disc ball seat, the latter forming a ball chamber with the top end of the knob recess, and a ball in the chamber seated on the opposite end of the spring.

References Cited in the file of this patent

UNITED STATES PATENTS

| | | |
|---|---|---|
| 865,486 | Gannon | Sept. 10, 1907 |
| 895,842 | Chambers | Aug. 11, 1908 |
| 2,373,812 | Coop | Apr. 17, 1945 |